US012791157B2

(12) United States Patent
Inomata et al.

(10) Patent No.: US 12,791,157 B2
(45) Date of Patent: Nov. 10, 2026

(54) PROJECTION OPTICAL SYSTEM

(71) Applicant: NALUX CO., LTD., Osaka (JP)

(72) Inventors: Toru Inomata, Osaka (JP); Tomohito Kuwagaito, Osaka (JP)

(73) Assignee: NALUX CO., LTD., Osaka (JP)

( * ) Notice: Subject to any disclaimer, the term of this patent is extended or adjusted under 35 U.S.C. 154(b) by 190 days.

(21) Appl. No.: 18/924,153

(22) Filed: Oct. 23, 2024

(65) Prior Publication Data

US 2025/0052391 A1 Feb. 13, 2025

Related U.S. Application Data

(63) Continuation of application No. PCT/JP2023/023751, filed on Jun. 27, 2023.

(51) Int. Cl.
*F21S 41/255* (2018.01)
*F21V 5/00* (2018.01)

(52) U.S. Cl.
CPC ............ *F21S 41/255* (2018.01); *F21V 5/008* (2013.01)

(58) Field of Classification Search
CPC ............................... F21S 41/255; F21V 5/008
See application file for complete search history.

(56) References Cited

U.S. PATENT DOCUMENTS

| | | | |
|---|---|---|---|
| 2019/0086051 A1* | 3/2019 | Motohashi | F21S 41/153 |
| 2023/0119358 A1 | 4/2023 | Yamazaki | |

FOREIGN PATENT DOCUMENTS

| | | |
|---|---|---|
| EP | 4 130 837 A1 | 2/2023 |
| JP | 2019-057368 A | 4/2019 |
| JP | 2021-152594 A | 9/2021 |

OTHER PUBLICATIONS

International Search Report and Written Opinion dated Sep. 12, 2023 corresponding to International Patent Application No. PCT/JP2023/023751.

* cited by examiner

*Primary Examiner* — Wen Huang
(74) *Attorney, Agent, or Firm* — SQUIRE PATTON BOGGS (US) LLP

(57) ABSTRACT

A projection optical system comprising a first lens having a positive refractive power, a second lens having a negative refractive power and a third lens having a positive refractive power, the lenses being arranged in ascending order in number from the side of an illuminated object, wherein when the optical system is regarded as an imaging optical system receiving a light beam from the side of the illuminated object, the effective focal length is represented by f, the total refractive power is represented by Pt=1/f, each lens surface of the three lenses are referred to as a first lens surface to a sixth lens surface from the side of the illuminated object, the refractive power is represented by Pt, the center thickness of the second lens is represented by L2 and f number is represented by F, the expressions $$1.3 < P5/Pt$$

$$0.1 < L2/f < 0.25$$

$$F < 0.7$$

are satisfied.

6 Claims, 9 Drawing Sheets

PROJECTION OPTICAL SYSTEM

CROSS REFERENCE TO RELATED APPLICATION

This is a Continuation of International Patent Application No. PCT/JP2023/023751 filed Jun. 27, 2023, which designates the U.S. The contents of this application is hereby incorporated by reference.

TECHNICAL FIELD

The present invention relates to a projection optical system used for head lamps for vehicles and the like.

BACKGROUND ART

A projection optical system for ADB (Adaptive Driving Beam) light distribution control in the field of head lamps for vehicles has recently been developed (Patent document 1). In the ADB, an illuminated area and intensity of illumination are controlled by separately controlling plural LEDs (Light Emitting Diodes) arranged as a light source depending on circumstances concerning other vehicles ahead and the like. In the ADB, an illuminated area of each LED must be separately controlled. Accordingly, in a projection optical system, a flare that causes an unintended artifact must be minimized. Further, a bright projection optical system is preferable.

Accordingly, in the field of head lamps for vehicles and the like, there is a need for a bright projection optical system configured to minimize a flare.

PRIOR ART DOCUMENT

Patent Document

Patent document 1: JP2019057368 (A)

The object of the present invention is to provide a bright projection optical system configured to minimize a flare.

SUMMARY OF THE INVENTION

A projection optical system according to the present invention includes a first lens having a positive refractive power, a second lens having a negative refractive power and a third lens having a positive refractive power, the lenses being arranged in ascending order in number from the side of an illuminated object, wherein when the optical system is regarded as an imaging optical system that is configured to receive a light beam from the side of the illuminated object, the effective focal length is represented by f, the total refractive power is represented by Pt=1/f, each lens surface of the three lenses are referred to as a first lens surface to a sixth lens surface from the side of the illuminated object, the refractive power is represented by Pt, the center thickness of the second lens is represented by L2 and f number is represented by F, the expressions $$1.3 < P5/Pt$$

$$0.1 < L2/f < 0.25$$

$$F < 0.7$$

are satisfied.

According to the present invention, when the optical system is regarded as an imaging optical system that is configured to receive a light beam from the side of the illuminated object and the comatic aberration of the imaging optical system is reduced, a flare corresponding to the comatic aberration in the projection optical system is reduced. Further, brightness of the projection optical system is sufficiently great.

In the projection optical system according to a first embodiment of the present invention, when the optical system is regarded as an imaging optical system that is configured to receive a light beam from the side of the illuminated object and the light beam is 25 degrees inclined from the optical axis, the ratio of an amount of the light beam reaching an image plane, to the total amount of the light beam is in a range from 14 percent to 20 percent.

In the projection optical system according to a second embodiment of the present invention, when the optical system is regarded as an imaging optical system that is configured to receive a light beam from the side of the illuminated object, the expression $$c/f < 0.00292$$

is satisfied, where c (in millimeter) represents a range of the longitudinal chronical aberration with respect to the d line (588 nanometers) between the wavelength of 0.420 micrometers and the wavelength of 0.680 micrometers and f (in millimeter) represents the effective focal length.

In the projection optical system according to the present embodiment, chromatic dispersion on a surface illuminated by the projection optical system is reduced.

In the projection optical system according to a third embodiment of the present invention, when the optical system is regarded as an imaging optical system that is configured to receive a light beam from the side of the illuminated object and the light beam is 20 degrees inclined from the optical axis, the value of distortion is negative and the absolute value of distortion is 5 percent or greater.

The projection optical system according to the present embodiment is capable of illuminating a wider area than in the case of a projection optical system without distortion.

In the projection optical system according to a fourth embodiment of the present invention, material of the first lens is acryl, material of the second lens is polycarbonate and material of the third lens is acryl.

In the projection optical system according to the present embodiment, chromatic dispersion on a surface illuminated by the projection optical system can be reduced by reducing longitudinal chronical aberration when the optical system is regarded as an imaging optical system that is configured to receive a light beam from the side of the illuminated object. The longitudinal chronical aberration can be reduced by the use of acryl and polycarbonate that have different values of refractive index from each other as material of each of the three lenses.

In the projection optical system according to a fifth embodiment of the present invention, the first lens is a biconvex lens, the second lens is a biconcave lens and the first lens is a biconvex lens.

DESCRIPTION OF EMBODIMENTS

Figure 1:
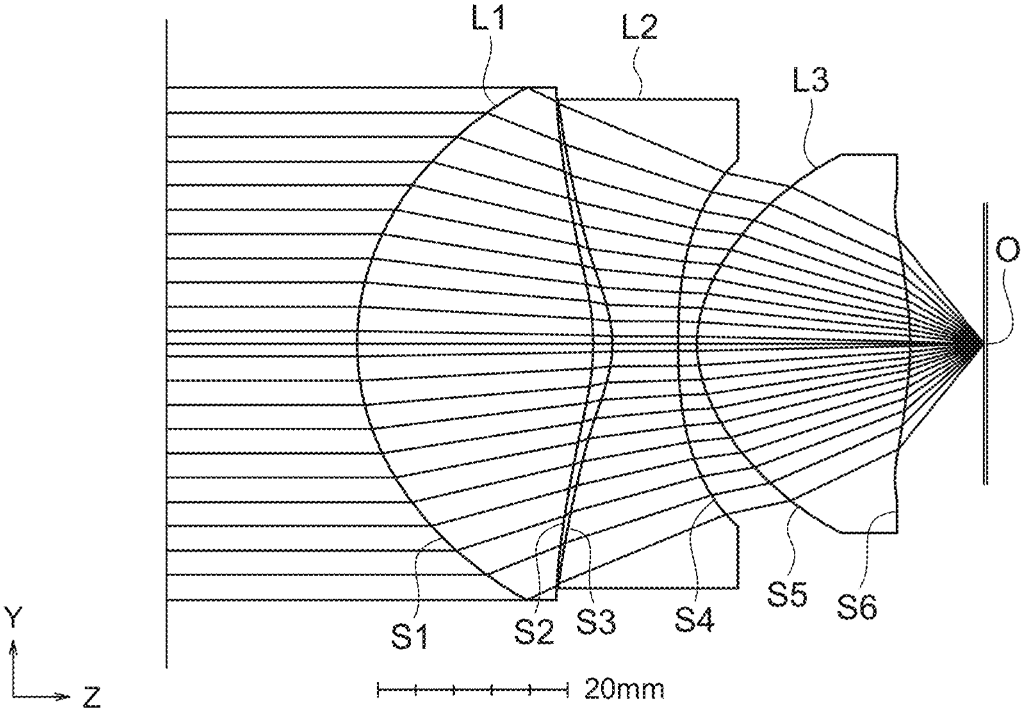
FIG. 1 shows an example of a projection optical system according to the present invention.

FIG. 1 shows an example of a projection optical system according to the present invention. The projection optical system includes a first lens L1, a second lens L2 and a third lens L3 and is configured to illuminate an object with a light source, the center of which is located at a point O. The first lens L1 is closest to the illuminated object and the third lens L3 is closest to the light source. The lens surface on the side of the illuminated object of each of the first lens L1, the second lens L2 and the third lens L3 is represented respectively by S1, S3 and S5 and the lens surface on the side of the light source of each of the first lens L1, the second lens L2 and the third lens L3 is represented respectively by S2, S4 and S6. The projection optical system is located such that the optical axis of the optical system passes through the point O. FIG. 1 shows paths of rays of light in the projection optical system in the case that a light beam parallel to the optical axis is made to enter the surface S1 from the side of the illuminated object of the optical system.

The shape of each lens surface is expressed by the following expression.

$$z = \frac{cr^2}{1+\sqrt{1-(1+k)c^2r^2}} + \alpha_1 r^2 + \alpha_2 r^4 + \alpha_3 r^6 + \alpha_4 r^8 + \alpha_5 r^{10} + \alpha_6 r^{12} + \alpha_7 r^{14} + \alpha_8 r^{16}$$

z represents coordinate of a point on the lens surface in the direction of optical axis with respect to the vertex of the lens surface. r represents distance from the optical ais of the point on the lens surface. c represents curvature, k represents a conic constant and $\alpha_i$ represents an aspherical coefficient. The sign of curvature c is so defined as to be positive when the lens surface is convex toward the side of the illuminated object and to be negative when the lens surface is concave toward the side of the illuminated object.

Table 1 shows the shape, material and a position of each lens surface of the projection optical system of the example.

TABLE 1

| Lens surface | Radius of curvature mm | Thickness or distance mm | Material | Effective diameter mm | Conic constant |
|---|---|---|---|---|---|
| S1 | 25.28566 | 24.892 | Acryl | 53.95 | −0.9998326 |
| S2 | −26.3513 | 1.979032 | Air | 51.6493 | −0.9416861 |
| S3 | −12.2071 | 6.992 | Poly-carbonate | 51.36387 | −5.828199 |
| S4 | 60.36136 | 1.924931 | Air | 38.8206 | −7.790394 |
| S5 | 10.35067 | 22.628 | Acryl | 39.6543 | −4.225318 |
| S6 | −33.7162 | 7.9514248 | Air | 33.94613 | 2.107033 |

Radius of curvature is the reciprocal of the curvature c. "Thickness or distance" in the line of S1 represents the thickness (center thickness) of the first lens L1 and "Thickness or distance" in the line of S6 represents the distance between the surface S6 and the point O at the center of the light source along the optical axis.

Table 2 shows values of aspherical coefficients of each lens surface. Values of aspherical coefficients that are not shown in the table are zero,

TABLE 2

| | S1 | S2 | S3 | S4 | S5 | S6 |
|---|---|---|---|---|---|---|
| α1 | 0 | 0 | 0 | 0 | 0 | 0 |
| α2 | 5.1580E−06 | 4.9160E−05 | 2.9798E−05 | 3.5590E−05 | 8.2308E−05 | 4.4728E−05 |
| α3 | −5.7254E−09 | −6.8093E−08 | −5.3050E−08 | −6.5260E−08 | −2.4252E−07 | −3.1610E−08 |
| α4 | 1.1030E−11 | 3.6832E−11 | 3.1890E−11 | 1.0094E−10 | 3.8193E−10 | 2.1121E−10 |

The projection optical system shown in FIG. 1 is regarded as an imaging optical system below. As described above, FIG. 1 shows paths of rays of light in the projection optical system in the case that a parallel light beam parallel to the optical axis is made to enter the surface S1 from the side of the illuminated object of the optical system. The above-described light beam is focused on the point O.

Figure 2:
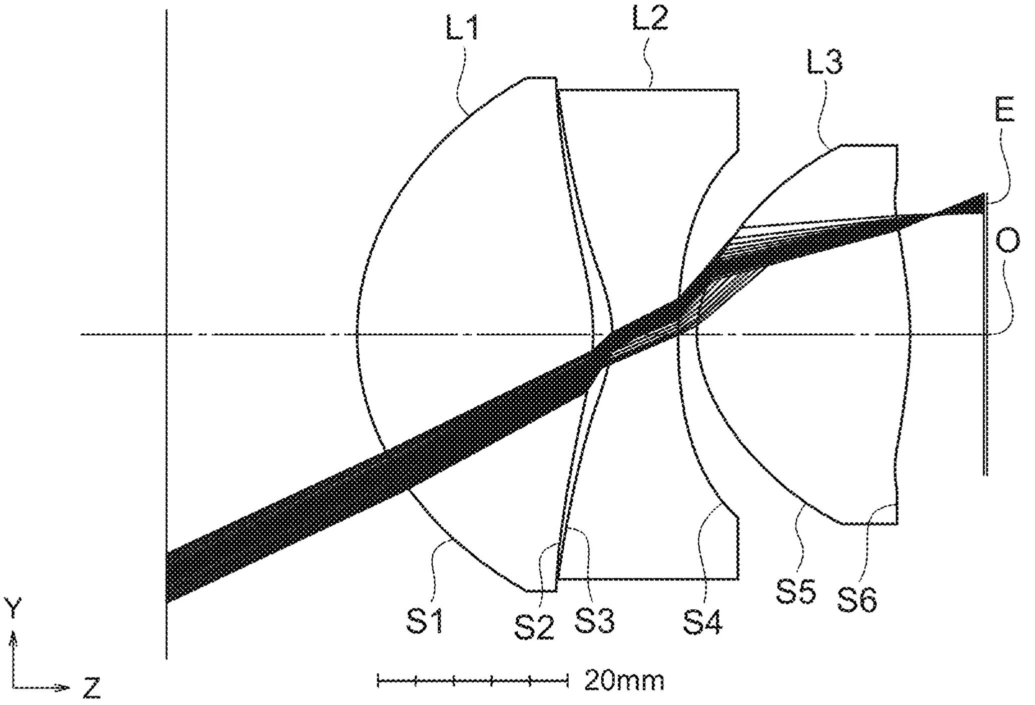
FIG. 2 shows paths of rays of light in the projection optical system shown in FIG. 1 in the case that a parallel light beam that is 25 degrees inclined from the optical axis is made to enter the surface S1 from the side of the illuminated object of the optical system.

FIG. 2 shows paths of rays of light in the projection optical system shown in FIG. 1 in the case that a parallel light beam that is 25 degrees inclined from the optical axis is made to enter the surface S1 from the side of the illuminated object of the optical system. The above-described parallel light beam reaches around a point E on the plane that contains the point O and is perpendicular to the optical axis. Taking into consideration the paths of rays of light shown in FIG. 1 and FIG. 2, it can be estimated that any point in the space in front of the projection optical system can be illuminated by a light source such as LEDs (light-emitting diodes) arranged at locations on the plane that contains the point O and is perpendicular to the optical axis, the locations being the distance between the point O and the point E or less away from the point O when an angle that a straight line connecting the point in the space and the point O forms with the optical axis is 25 degrees or less.

Table 3 shows the refractive power of each lens surface and the total refractive power of the imaging optical system. The total refractive power is the reciprocal of the effective focal length. In Table 3, "Ratio" means a ratio of the refractive power of each lens surface to the total refractive power. The effective focal length of the imaging optical system is 34.697 millimeters. The f-number is 0.65. In general, the f-number should preferably be 0.7 or smaller.

TABLE 3

| | Refractive power (1/mm) | Ratio |
|---|---|---|
| Total refractive power | 0.029 | 1 |
| S1 | 0.0194 | 0.673 |
| S2 | 0.0186 | 0.645 |
| S3 | −0.0479 | −1.662 |
| S4 | −0.0097 | −0.337 |
| S5 | 0.0475 | 1.648 |
| S6 | 0.0146 | 0.507 |

As shown in Table 3, the refractive power of the lens surface S5 is relatively great in the present example. The reason that the refractive power of the lens surface S5 is relatively great will be described below.

In projection optical systems, a flare that is illumination on an unintended area is occasionally generated. The flare is a great obstacle to the ADB light distribution control by which an area that is illuminated by each LED must be determined with a high accuracy. The flare in a projection optical system corresponds to the comatic aberration when the projection optical system is regarded as an imaging optical system. In order words, the greater the comatic aberration in an imaging optical system becomes, the greater the flare in the projection optical system corresponding to the imaging optical system becomes. Accordingly, in order to reduce the flare in the projection optical system, the comatic aberration in the imaging optical system corresponding to the projection optical system must be reduced. One way to reduce the comatic aberration is vignetting, in which an amount of a parallel light beam that reach the plane that contains the point O and is perpendicular to the optical axis is reduced, the parallel light beam being relatively greatly inclined from the optical axis.

Figure 3:
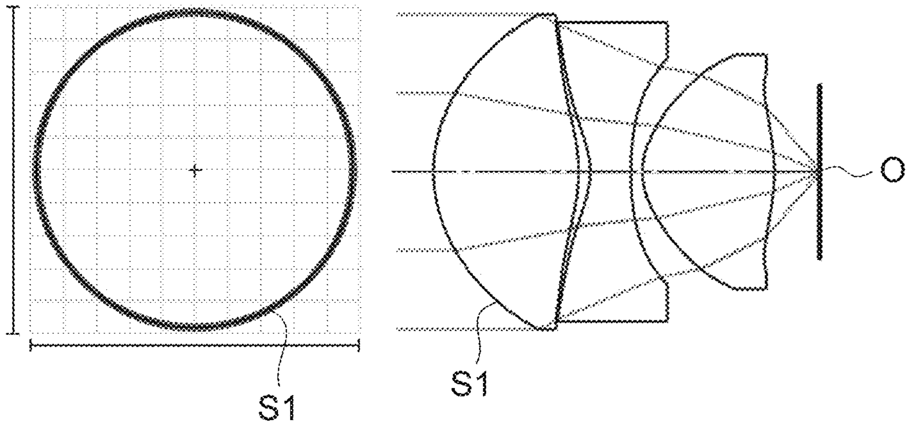
FIG. 3 shows an area of the surface S1 of the optical system, through which rays of a parallel light beam that is parallel to the optical axis and has entered the surface S1 and reached the plane that contains the point O and is perpendicular to the optical axis without undergoing vignetting.

FIG. 3 shows an area of the surface S1 of the optical system, through which rays of a parallel light beam parallel to the optical axis, the rays having entered the surface S1 and reached the plane that contains the point O and is perpendicular to the optical axis without undergoing vignetting pass. The drawing on the left side of FIG. 3 shows a plan view of the surface S1 and the drawing on the right side of FIG. 3 shows paths of rays in the optical system as FIG. 1 does. According to FIG. 3, almost all of the rays of light that pass through the whole area of the surface S1 reach the plane that contains the point O and is perpendicular to the optical axis without undergoing vignetting.

Figure 4:
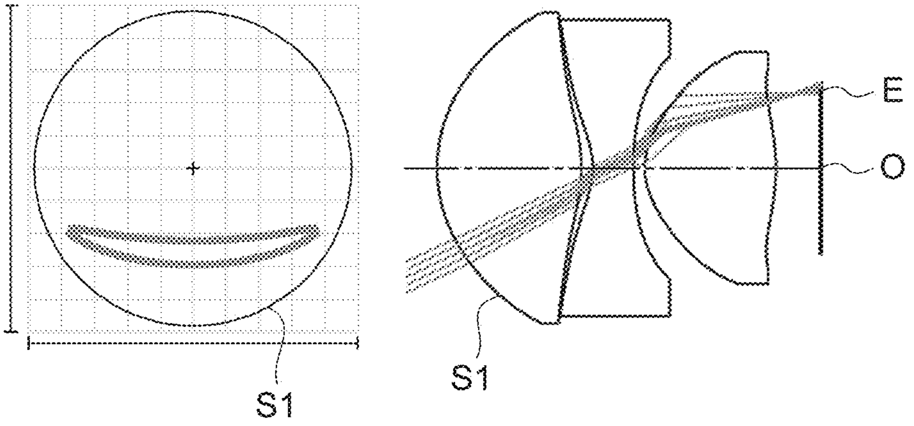
FIG. 4 shows an area of the surface S1 of the optical system, through which rays of a parallel light beam that is 25 degrees inclined from the optical axis, the rays having entered the surface S1 and reached the plane that contains the point O and is perpendicular to the optical axis without undergoing vignetting.

FIG. 4 shows an area of the surface S1 of the optical system, through which rays of a parallel light beam that is 25 degrees inclined from the optical axis, the rays having entered the surface S1 and reached the plane that contains the point O and is perpendicular to the optical axis without undergoing vignetting, pass. The drawing on the left side of FIG. 4 shows a plan view of the surface S1 and the drawing on the right side of FIG. 4 shows paths of rays of light in the optical system as FIG. 2 does. According to FIG. 4, a ratio of the area of the surface S1, through which the rays that reach the plane that contains the point O and is perpendicular to the optical axis without undergoing vignetting pass, to the whole area of the surface S1 is 20 percent or smaller.

Figure 5:
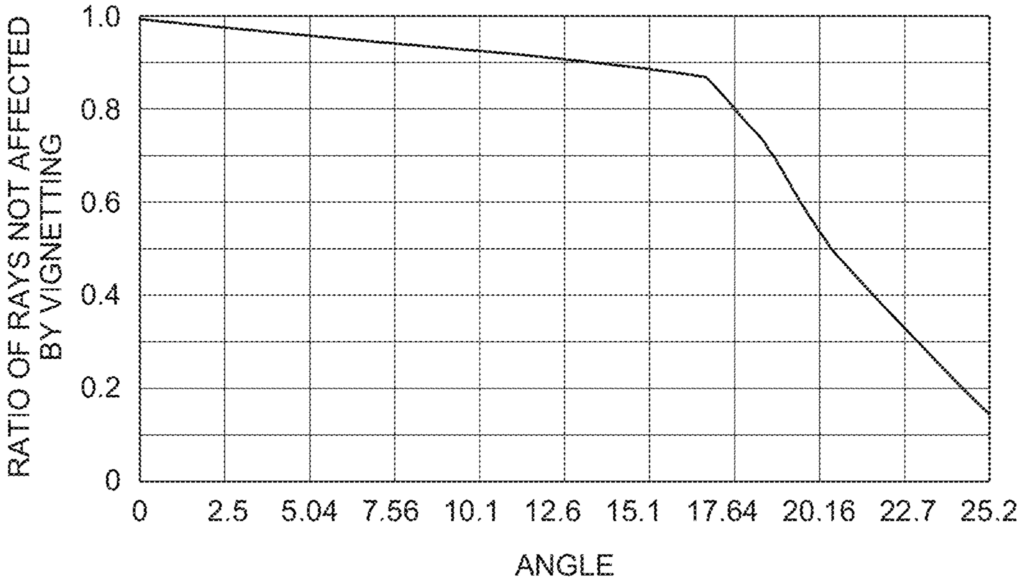
FIG. 5 shows a ratio of rays of a parallel light beam that has entered the surface S1 of the optical system, the rays reaching the plane that contains the point O and is perpendicular to the optical axis without undergoing vignetting, to all the rays of the parallel light beam.

FIG. 5 shows a ratio of rays of a parallel light beam that has entered the surface S1 of the optical system, the rays reaching the plane that contains the point O and is perpendicular to the optical axis without undergoing vignetting to all the rays of the parallel light beam. The horizontal axis of FIG. 5 indicates angle of inclination from the optical axis of the parallel light beam. The vertical axis indicates the ratio of rays of light, the rays reaching the plane that contains the point O and is perpendicular to the optical axis without undergoing vignetting. According to FIG. 5, the ratio of an amount of the parallel light beam reaching the plane that contains the point O and is perpendicular to the optical axis without undergoing vignetting to the total amount of the parallel light beam is approximately 15 percent when the angle of inclination of the parallel light beam from the optical axis is 25 degrees.

As shown in FIG. 4, vignetting is more easily generated for some of rays of light that are diverged by the surface S4 by reducing the radius of curvature and increasing the refractive power of the surface S5 when the angle of inclination from the optical axis of a parallel light beam is 25 degrees. As a result, the ratio of rays of light, the rays reaching the plane that contains the point O and is perpendicular to the optical axis without undergoing vignetting to all the rays of light is reduced In general, a ratio of the refractive power of the surface S5 to the total refractive power should preferably be greater than 1.3. When the angle of inclination from the optical axis of a parallel light beam is 25 degrees, the ratio of an amount of the light beam reaching the plane that contains the point O and is perpendicular to the optical axis without undergoing vignetting to the total amount of the light beam should preferably be in a range from 14 percent and 20 percent.

Table 4 shows aberrations of each surface of the imaging optical system.

TABLE 4

| Surface | Spherical aberration | Comatic aberration | Astigmatism | Curvature of field | Distortion | Longitudinal chromatic aberration | Chromatic aberration of magnification |
|---|---|---|---|---|---|---|---|
| S1 | 1.90048 | 3.207758 | 1.413495 | 2.10592 | 1.550827 | −0.313768 | −0.138262 |
| S2 | 3.737154 | −10.874825 | −4.472711 | 2.020754 | −1.962751 | −0.30916 | 0.005171 |
| S3 | 82.484417 | 66.045292 | 37.907428 | −4.899495 | 19.328786 | 0.880787 | 0.147384 |
| S4 | −10.376525 | −8.031487 | −7.351398 | −0.990846 | −12.699869 | 0.13953 | 0.406248 |
| S5 | −93.503004 | −67.727649 | −44.358463 | 5.144557 | −15.712054 | −0.298044 | −0.381158 |
| S6 | 2.323199 | 0.862021 | −0.676817 | 1.579346 | −2.72826 | −0.06123 | −0.03351 |
| Total | −13.434278 | −16.51889 | −17.538466 | 4.960238 | −12.223321 | 0.038115 | 0.005874 |

"Total" means a sum of aberrations of all the surfaces, that is, the total aberration of the imaging optical system. According to Table 4, aberrations of the surface S5 contribute to reduction in the total aberrations. The total aberrations of the imaging optical system tend to increase when the radius of curvature of the surface S5 is made greater (or when the refractive power the surface S5 is made smaller). Also from this standpoint, the ratio of the refractive power of the surface S5 to the total refractive power should preferably be in the range described above.

Figure 6:
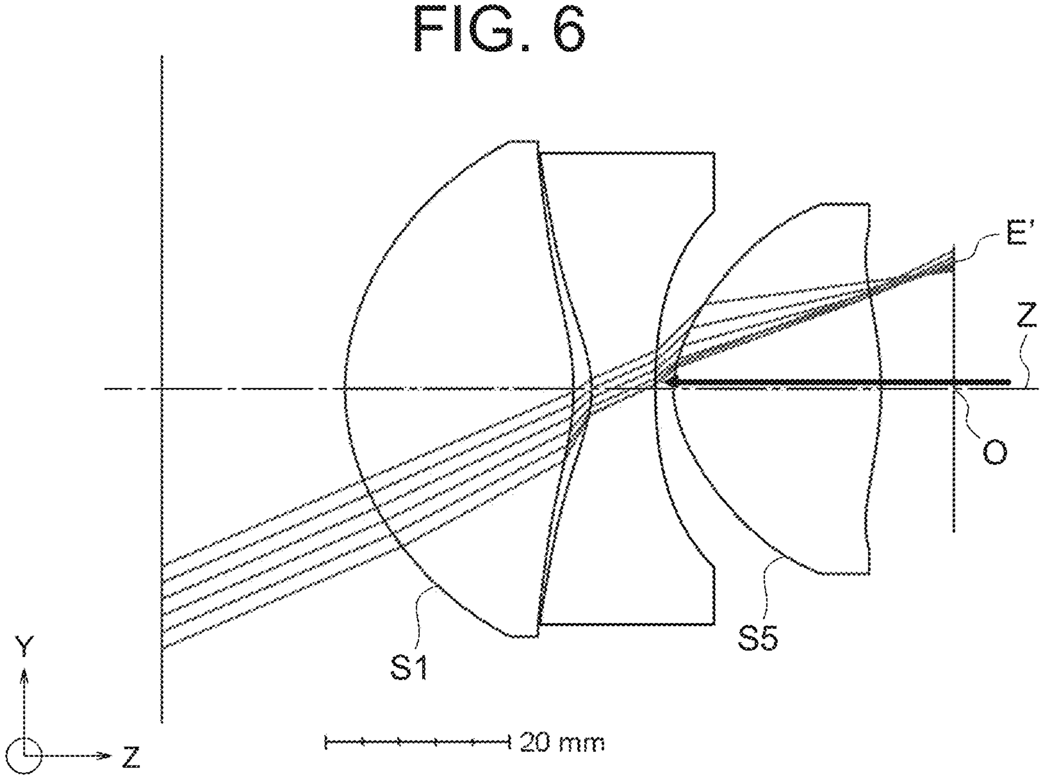
FIG. 6 shows paths of rays of light in the projection optical system shown in FIG. 1 in the case that a parallel light beam that is 23 degrees inclined from the optical axis is made to enter the surface S1 from the side of the illuminated object of the optical system.

FIG. 6 shows paths of rays of light in the projection optical system shown in FIG. 1 in the case that a parallel light beam that is 23 degrees inclined from the optical axis is made to enter the surface S1 from the side of the illuminated object of the optical system. The above-described parallel light beam reaches around a point E' on the plane that contains the point O and is perpendicular to the optical axis. In FIG. 6, the origin is defined to be the point O and a z-axis is defined to be the optical axis of the optical system. An x-axis is in the direction perpendicular to the sheet on which FIG. 6 is drawn.

Figure 7:
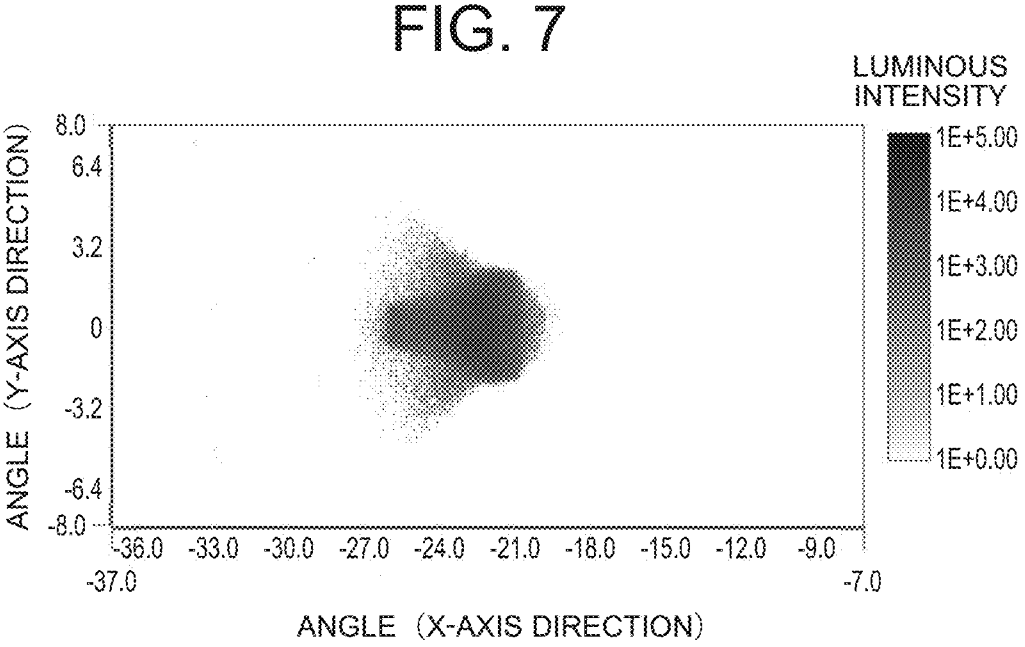
FIG. 7 shows a flare on a plane perpendicular to the z-axis generated by a light source that is located on the x-axis and the distance between the point O and the point E' away from the point O.

FIG. 7 shows a flare on a plane perpendicular to the z-axis generated by a light source that is located on the x-axis and the distance between the point O and the point E' away from the point O. By way of example, a light source is a light emitting diode. The horizontal axis of FIG. 7 indicates angle that a straight line that is a projection of a path of a ray of light emitted by a light source onto the x-z plane forms with the z-axis. The vertical axis of FIG. 7 indicates angle that a straight line that is a projection of the path of the ray of light emitted by the light source onto the y-z plane forms with the z-axis.

Another projection optical system will be described as a comparative example below.

Table 5 shows the shape, material and a position of each lens surface of the projection optical system of the comparative example.

TABLE 5

| Lens surface | Radius of curvature mm | Thickness or distance mm | Material | Effective diameter mm | Conic constant |
|---|---|---|---|---|---|
| S1 | 25.2856 | 24.880 | Acryl | 53.9500 | −0.99983 |
| S2 | −21.962 | 0.200 | Air | 53.9500 | −0.99092 |
| S3 | −21.683 | 2.500 | Poly-carbonate | 53.9500 | −6.12780 |
| S4 | 14.546 | 1.922 | Air | 44.9340 | −3.20778 |
| S5 | 10.287 | 25.045 | Acryl | 36.0000 | −2.15338 |
| S6 | −22.005 | 8.838 | Air | 36.1380 | 0.06882 |

"Thickness or distance" in the line of S1 represents the thickness (center thickness) of the first lens L1 and "Thickness or distance" in the line of S6 represents the distance between the surface S6 and the point O at the center of the light source along the optical axis.

Table 6 shows values of aspherical coefficients of each lens surface.

TABLE 6

| | S1 | S2 | S3 | S4 | S5 | S6 |
|---|---|---|---|---|---|---|
| α1 | 0.000E+00 | 0.000E+00 | 0.000E+00 | 0.000E+00 | 0.000E+00 | 0.000E+00 |
| α2 | 5.158E−06 | 6.260E−05 | 3.485E−05 | 1.201E−06 | 1.476E−05 | 1.125E−04 |
| α3 | −5.725E−09 | −6.779E−08 | −4.669E−08 | 2.152E−08 | −7.654E−09 | −2.936E−07 |
| α4 | 1.103E−11 | 2.656E−11 | 2.069E−11 | 1.184E−11 | 4.666E−11 | 4.761E−10 |

Table 7 shows the refractive power of each lens surface and the total refractive power of the imaging optical system. The total refractive power is the reciprocal of the effective focal length. In Table 7 "Ratio" means a ratio of the refractive power of each lens surface to the total refractive power. The effective focal length of the imaging optical system is 34.799 millimeters. The f-number is 0.66.

TABLE 7

| | Refractive power (1/mm) | Ratio |
|---|---|---|
| Total refractive power | 0.029 | 1 |
| S1 | 0.0195 | 0.679 |
| S2 | 0.0225 | 0.783 |
| S3 | −0.0271 | −0.943 |
| S4 | −0.0404 | −1.406 |
| S5 | 0.048 | 1.670 |
| S6 | 0.0224 | 0.779 |

Figure 8:
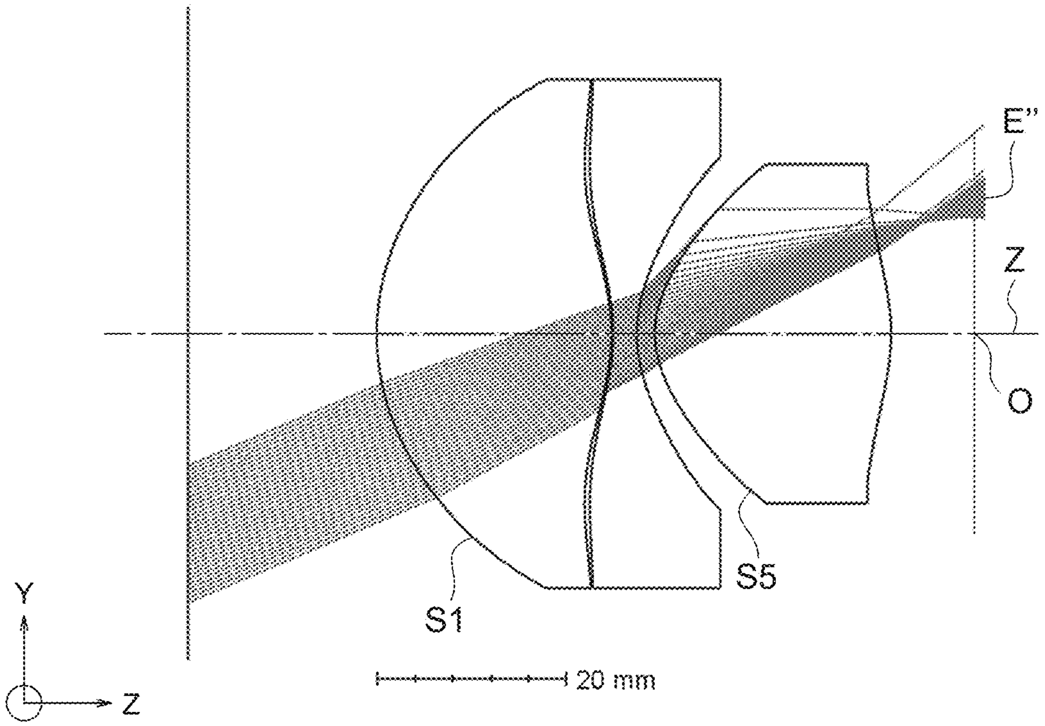
FIG. 8 shows paths of rays of light in the projection optical system of the comparative example in the case that a parallel light beam that is 23 degrees inclined from the optical axis is made to enter the surface S1 from the side of the illuminated object of the optical system.

FIG. 8 shows paths of rays of light in the projection optical system of the comparative optical system in the case that a parallel light beam that is 23 degrees inclined from the optical axis is made to enter the surface S1 from the side of the illuminated object of the optical system. The above-described parallel light beam reaches around a point E" on the plane that contains the point O and is parallel to the optical axis. In FIG. 8, the origin is defined to be the point O and a z-axis is defined to be the optical axis of the optical system. An x-axis is in the direction perpendicular to the sheet on which FIG. 8 is drawn.

Figure 9:
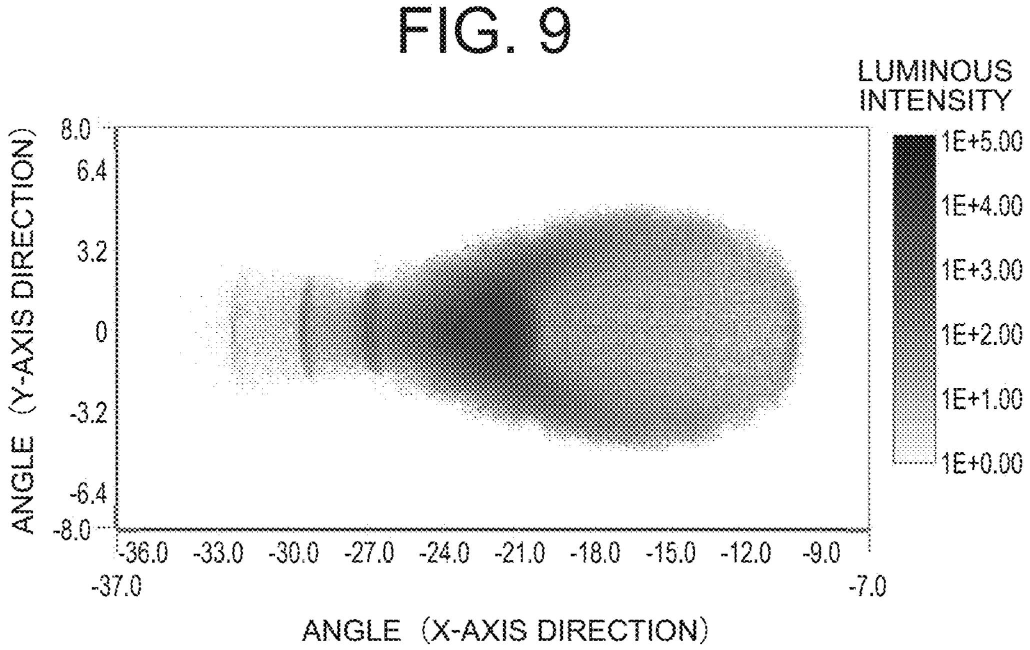
FIG. 9 shows a flare on a plane perpendicular to the z-axis generated by a light source that is located on the x-axis and the distance between the point O and the point E' away from the point O.

FIG. 9 shows a flare on a plane perpendicular to the z-axis generated by a light source that is located on the x-axis and the distance between the point O and the point E' away from the point O. By way of example, a light source is a light emitting diode. The horizontal axis of FIG. 9 indicates angle that a straight line that is a projection of a path of a ray of light emitted by a light source onto the x-z plane forms with the z-axis. The vertical axis of FIG. 9 indicates angle that a straight line that is a projection of the path of the ray of light emitted by the light source onto the y-z plane forms with the z-axis.

When FIG. 7 that shows a flare generated by the projection optical system of the example and FIG. 9 that shows a flare generated by the projection optical system of the comparative example are compared with each other, a great flare directed inward is observed in FIG. 9. A flare directed inward of a projection optical system corresponds to a comatic aberration directed outward in the corresponding imaging optical system. Accordingly, when the projection optical system of the comparative example is regarded as an imaging optical system, the comatic aberration of the imaging optical system does not seem to have been sufficiently reduced.

When Table 3 and Table 7 are compared with each other, the refractive power of the surface S5 is substantially identical. On the other hand, according to Table 2, the center thickness of the second lens of the optical system of the example is 6.992 millimeters and according to Table 5, the center thickness of the second lens of the optical system of the comparative example is 2.500 millimeters.

According to FIG. 6, in the optical system of the example, in the case that a parallel light beam that is 23 degrees inclined from the optical axis is made to enter the surface S1, the beam enters an area of the surface S5, the area being located above the optical axis. On the other hand, according to FIG. 8, in the optical system of the comparative example, in the case that a parallel light beam that is 23 degrees inclined from the optical axis is made to enter the surface S1, the beam enters an area of the surface S5, the area straddling the optical axis and covering portions above and below the optical axis. It is estimated that rays of light that enter the area of the surface S5, which straddles the optical axis and covers portions above and below the optical axis, make the comatic aberration great. Considering the shape of each lens of the example and the shape of each lens of the comparative example, it is expected that in the case that a parallel light beam that is 23 degrees inclined from to the optical axis is made to enter the surface S1, the area of the surface S5 that rays of light enter can be adjusted by adjusting the center thickness of the second lens.

In optical systems, in which the center thickness of the second lens is changed from that of the optical system of the example, paths of rays of light are obtained in the case that a parallel light beam that is 23 degrees inclined from the optical axis is made to enter the surface S1. In the optical systems, the numerical data other than that of the center thickness of the second lens are identical with those of the optical system of the example.

Figure 10:
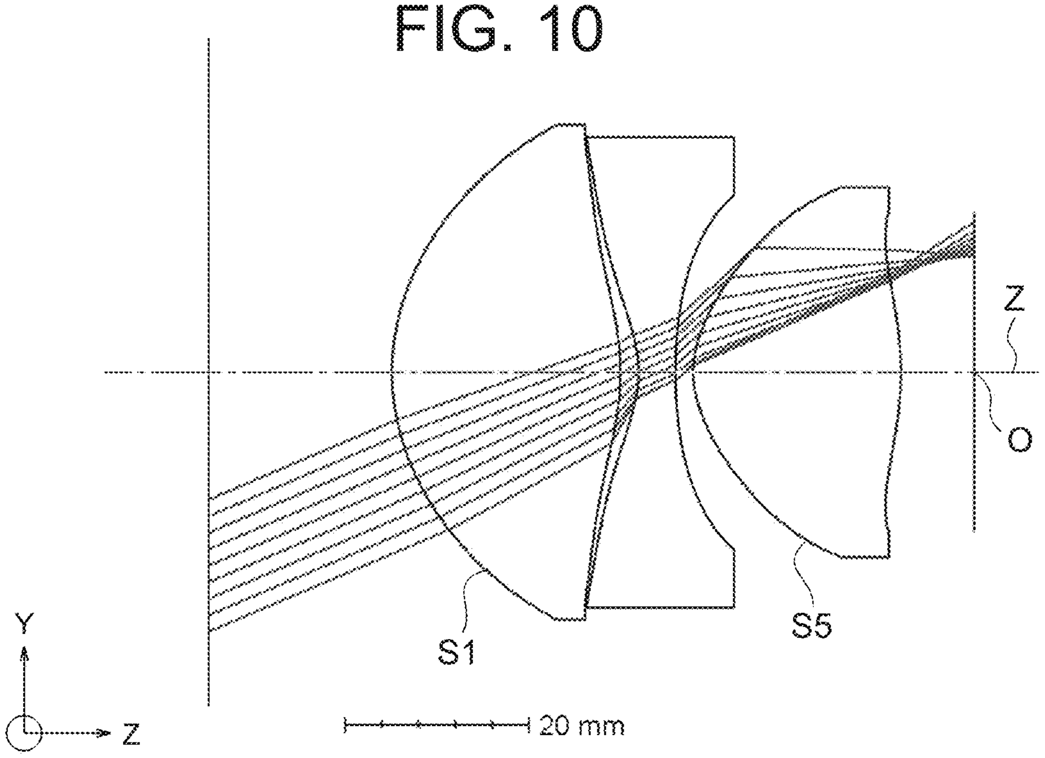
FIG. 10 shows paths of rays of light in an optical system, in which a value of center thickness of the second lens is 4.0 millimeters, in the case that a parallel light beam that is 23 degrees inclined from the optical axis is made to enter the surface S1 of the optical system.

FIG. 10 shows paths of rays of light in an optical system, in which a value of the center thickness of the second lens is 4.0 millimeters, in the case that a parallel light beam that is 23 degrees inclined from the optical axis is made to enter the surface S1 of the optical system.

Figure 11:
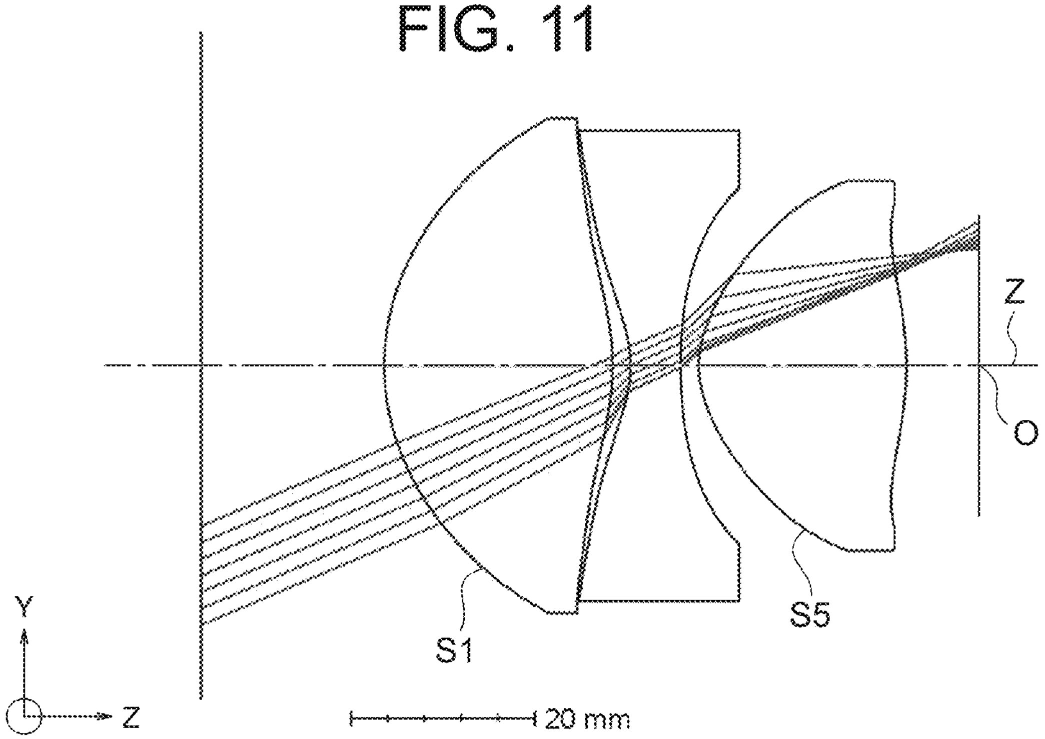
FIG. 11 shows paths of rays of light in an optical system, in which a value of center thickness of the second lens is 5.5 millimeters, in the case that a parallel light beam that is 23 degrees inclined from the optical axis is made to enter the surface S1 of the optical system.

FIG. 11 shows paths of rays of light in an optical system, in which a value of the center thickness of the second lens is 5.5 millimeters, in the case that a parallel light beam that is 23 degrees inclined from the optical axis is made to enter the surface S1 of the optical system.

Figure 12:
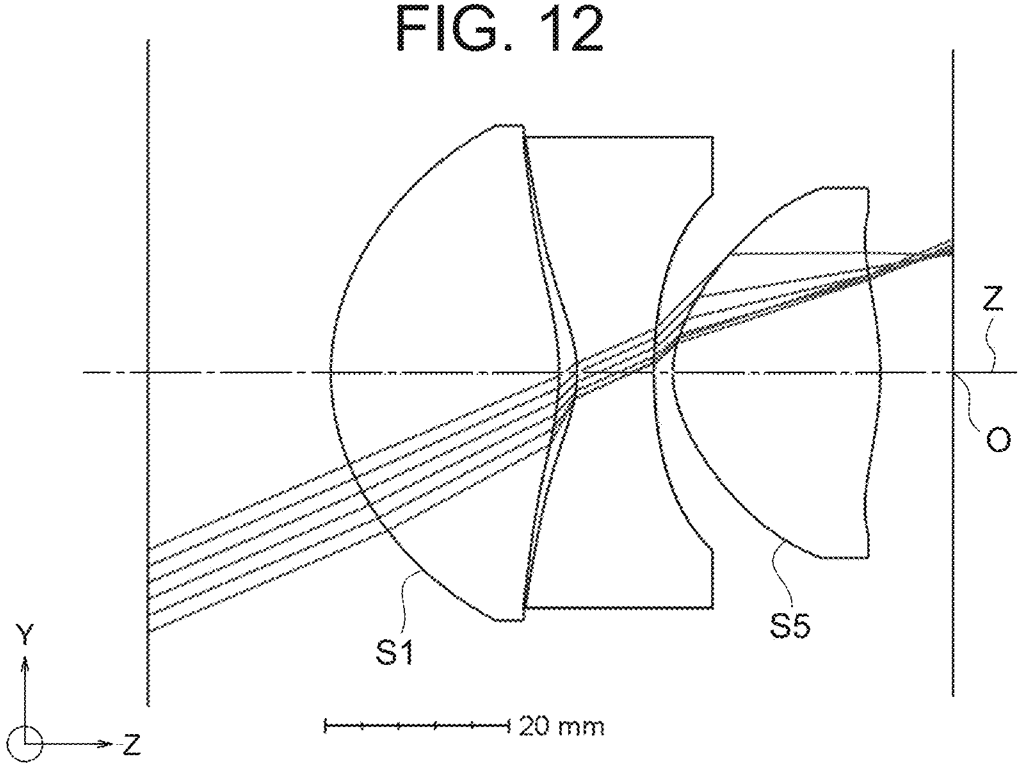
FIG. 12 shows paths of rays of light in an optical system, in which a value of center thickness of the second lens is 8.5 millimeters, in the case that a parallel light beam that is 23 degrees inclined from the optical axis is made to enter the surface S1 of the optical system.

FIG. 12 shows paths of rays of light in an optical system, in which a value of the center thickness of the second lens is 8.5 millimeters, in the case that a parallel light beam that is 23 degrees inclined from the optical axis is made to enter the surface S1 of the optical system.

According to FIGS. 10-12, in each optical system, in the case that a parallel light beam that is 23 degrees inclined from the optical axis is made to enter the surface S1, the beam enters an area of the surface S5, the area being located above the optical axis. Accordingly, it is estimated that the comatic aberration can be reduced. Normalized values of the center thickness of the second lens, which are obtained by dividing the values of the center thickness 4.0 millimeters, 5.5 millimeters and 8.5 millimeters by the effective focal length of the projection optical system of the example (34.697 millimeters), are respectively 0.115, 0.159 and 0.245. On the other hand, a too great value of the center thickness causes problems of a long molding time in the production and high material costs, and therefore is not preferable. In conclusion, the normalized value of the center thickness of the second lens obtained using the effective focal length of the optical system should preferably be in a range from 0.1 to 0.25.

Figure 13:
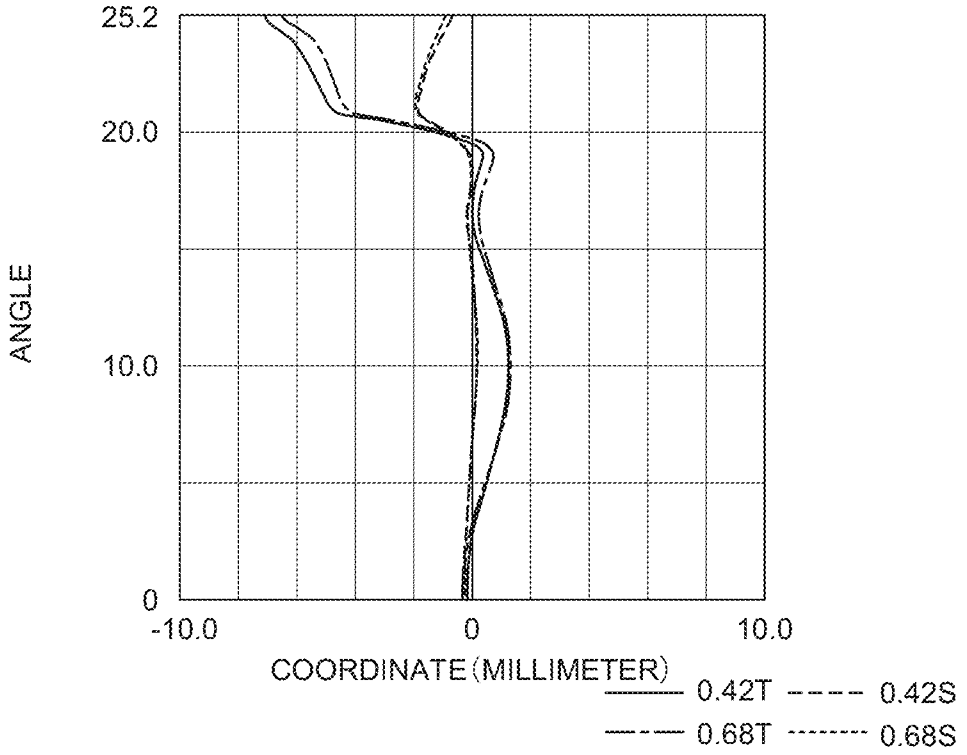
FIG. 13 shows curvature of field in the case that the optical system of the example is regarded as an imaging optical system.

FIG. 13 shows curvature of field in the case that the optical system of the example is regarded as an imaging optical system. The horizontal axis of FIG. 13 indicates coordinate in the z-axis direction of the position of an image point. The origin of coordinate is defined to be the point O and the sign of the coordinate is negative on the side of the illuminated object. The unit is millimeter. The vertical axis of FIG. 13 indicates angle that a parallel light beam entering the surface S1 forms with the optical axis. The unit is degree. "0.42 T" indicates the position of an image point of a light beam having the wavelength of 0.42 micrometers in the tangential image plane and "0.42 S" indicates the position of an image point of the light beam having the wavelength of 0.42 micrometers in the sagittal image plane. "0.68 T" indicates the position of an image point of a light beam having the wavelength of 0.68 micrometers in the tangential image plane and "0.68 S" indicates the position of an image point of the light beam having the wavelength of 0.68 micrometers in the sagittal image plane.

Figure 14:
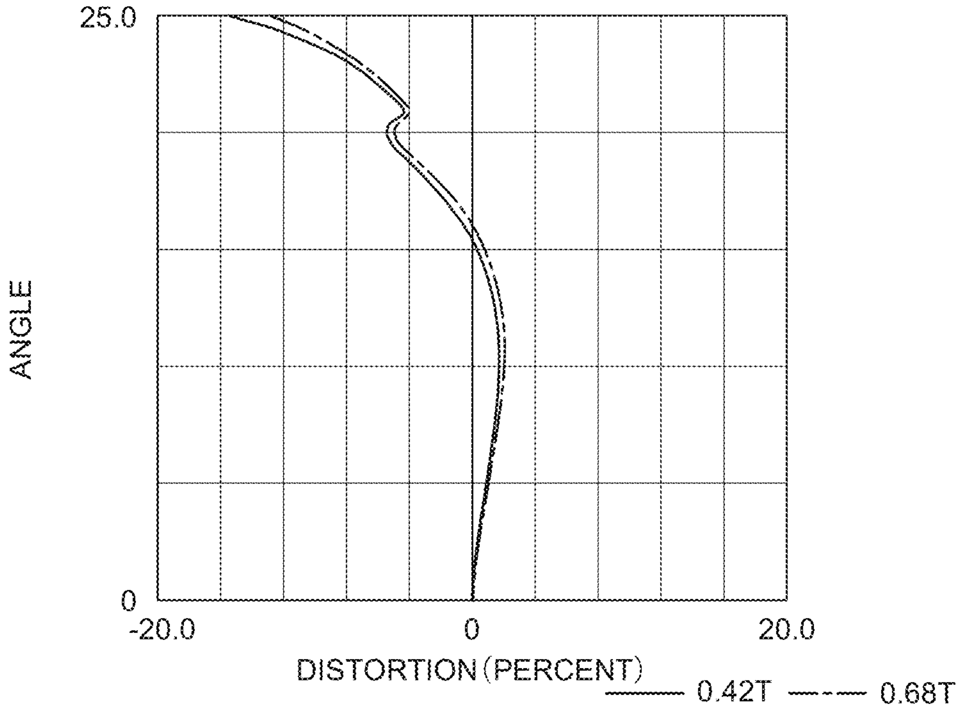
FIG. 14 shows distortion in the case that the optical system of the example is regarded as an imaging optical system.

FIG. 14 shows distortion in the case that the optical system of the example is regarded as an imaging optical system. Distortion is a ratio of the lateral magnification of an imaging optical system to the lateral magnification of the ideal imaging optical system. The horizontal axis of FIG. 14 indicates distortion. The unit is percent. The vertical axis of FIG. 14 indicates angle that a parallel light beam entering the surface S1 forms with the optical axis. The unit is degree. The value of distortion in the case of the angle of 20 degrees is approximately −5 percent. Since values of distortion are negative in a relatively large angle range, an illuminated area of the projection optical system is larger than an illuminated area of the ideal optical system.

In general, it is preferable that the value of distortion is negative and the absolute value of distortion is 5 percent or greater in the case that the angle that a parallel light beam entering the surface S1 forms with the optical axis is 20 degrees.

Figure 15:
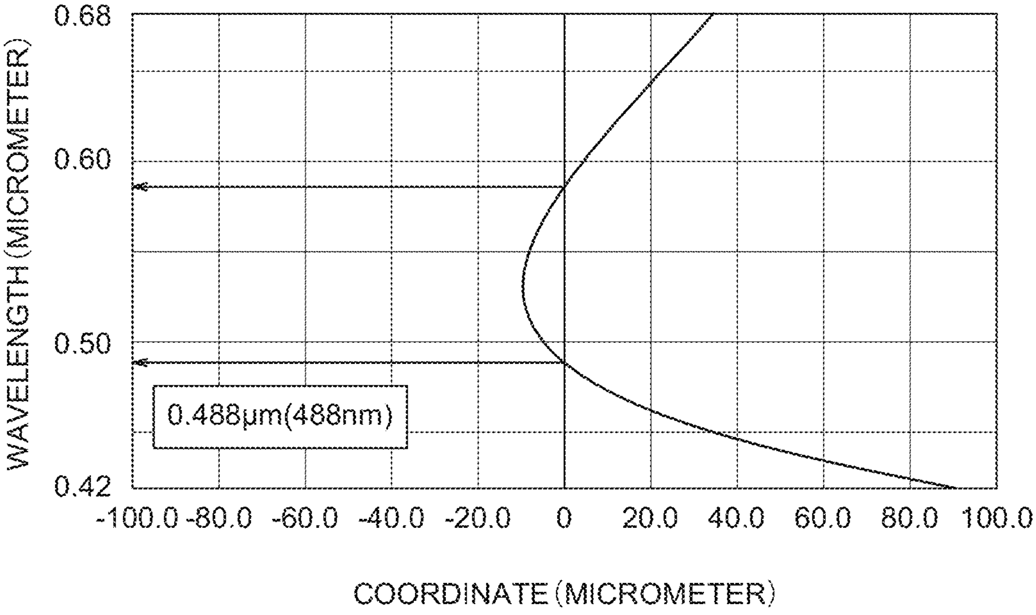
FIG. 15 shows longitudinal chromatic aberration in the case that the optical system of the example is regarded as an imaging optical system.

FIG. 15 shows longitudinal chromatic aberration in the case that the optical system of the example is regarded as an imaging optical system. The horizontal axis of FIG. 15 indicates coordinate in the z-axis direction of the position of an image point. The origin of coordinate is defined to be the point O and the sign of the coordinate is negative on the side of the illuminated object. The unit is micrometer. The vertical axis of FIG. 15 indicates wavelength of a ray of light. The unit is micrometer. The imaging optical system is achromat and configured such that the coordinate in the horizontal axis for the d line (588 nanometers) that is the principal wavelength and the coordinate in the horizontal axis for the wavelength of 488 nanometers are identical with each other. Accordingly, chromatic dispersion on a plane illuminated by the projection optical system can be reduced. In general, in order to reduce chromatic dispersion on a plane illuminated by a projection optical system, the expression $$c/f<0.00292$$

should preferably be satisfied, where c (in millimeter) represents a range of the longitudinal chronical aberration with respect to the d line (588 nanometers) between the wavelength of 0.420 micrometers and the wavelength of 0.680 micrometers and f represents the effective focal length (in millimeter) in the case that the optical system is regarded as an imaging optical system and a light beam is made to enter the surface S1 from the side of the illuminated object of the optical system.

What is claimed is:

1. A projection optical system comprising a first lens having a positive refractive power, a second lens having a negative refractive power and a third lens having a positive refractive power, the lenses being arranged in ascending order in number from a side of an illuminated object, wherein when the projection optical system is regarded as an imaging optical system that is configured to receive a light beam from the side of the illuminated object, an effective focal length is represented by f, a total refractive power is represented by Pt=1/f, each lens surface of the three lenses are referred to as a first lens surface to a sixth lens surface from the side of the illuminated object, a refractive power of a fifth lens surface is represented by P5, a center thickness of the second lens is represented by L2 and f number is represented by F, expressions $$1.3<P5/Pt$$

$$0.1<L2/f<0.25$$

$$F<0.7$$

are satisfied.

2. The projection optical system according to claim 1, wherein when the projection optical system is regarded as an imaging optical system that is configured to receive a light beam from the side of the illuminated object and the light beam is 25 degrees inclined from an optical axis, a ratio of an amount of the light beam reaching an image plane, to a total amount of the light beam is in a range from 14 percent to 20 percent.

3. The projection optical system according to claim 1, wherein when the projection optical system is regarded as an imaging optical system that is configured to receive a light beam from the side of the illuminated object, an expression $$c/f<0.00292$$

is satisfied, where c (in millimeter) represents a range of a longitudinal chronical aberration with respect to a d line (588 nanometers) between a wavelength of 0.420 micrometers and a wavelength of 0.680 micrometers and f (in millimeter) represents the effective focal length.

4. The projection optical system according to claim 1, wherein when the projection optical system is regarded as an imaging optical system that is configured to receive a light beam from the side of the illuminated object and the light beam is 20 degrees inclined from an optical axis, a value of distortion is negative and an absolute value of distortion is 5 percent or greater.

5. The projection optical system according to claim 1, wherein material of the first lens is acryl, material of the second lens is polycarbonate and material of the third lens is acryl.

6. The projection optical system according to claim 1, wherein the first lens is a biconvex lens, the second lens is a biconcave lens and the first third lens is a biconvex lens.

* * * * *